United States Patent [19]
Thwaites

[11] 3,800,899
[45] Apr. 2, 1974

[54] VEHICLE CHASSIS
[76] Inventor: Leslie Basil Thwaites, c/o The Thwaites Engineering Company Limited, Cubbington, near Leamington Spa, England
[22] Filed: May 25, 1972
[21] Appl. No.: 256,949

[30] Foreign Application Priority Data
June 1, 1971 Great Britain.................... 18230/71

[52] U.S. Cl.................... 180/49, 280/100, 280/109, 280/127
[51] Int. Cl............................................. B62d 7/00
[58] Field of Search........... 280/100, 109, 126, 127; 180/49, 50

[56] References Cited
UNITED STATES PATENTS
1,090,132 3/1914 Buchanan............................. 180/49

FOREIGN PATENTS OR APPLICATIONS
53,582 4/1921 Sweden................................ 180/49

Primary Examiner—Richard A. Schacher
Attorney, Agent, or Firm—Mawhinney & Mawhinney

[57] ABSTRACT

A vehicle chassis frame is supported by two axle assemblies through respective intermediate turntables permitting rotation of each axle assembly about its vertical axis. A pivoting support frame arranged between one of the axle assemblies and its turntable permits its ground wheels to pivot about a horizontal axis relatively to the ground wheels of the other axle assembly. The turntables are turned in opposite senses by a steering mechanism for the ground wheels of one axle to follow the tracks of the corresponding ground wheels of the other axle.

14 Claims, 4 Drawing Figures

VEHICLE CHASSIS

The invention relates to a vehicle chassis including a chassis frame supported by first and second axle assemblies each of which is provided with a pair of coaxial ground wheels, and it has particular, but not exclusive, reference to a vehicle such as a dumper.

To enable such a vehicle to have a good load carrying capacity with sufficient traction to enable it to carry its load over difficult terrain, it is desirable to have all the ground wheels driven. In my British Patent No. 946,593 I have taught the manner in which such an all-wheel-drive vehicle can be constructed whilst enabling the vehicle to be steered without differential slip occurring between the front and rear wheels, and the consequent risk of their respective drives becoming "wound-up." In my aforesaid patent this was achieved by forming a vehicle chassis with front and rear portions, each provided with a pair of coaxial ground wheels, a U-shaped bridge member having its limbs arranged to be vertical, one of the chassis portions being pivotally supported for lateral tilting on its fore-and-aft axis between the limbs of the bridge member which is pivotally connected to the other chassis portion to allow the chassis portions to be articulated about a substantially vertical axis which is equi-distant from the wheel axes for steering purposes, the wheels of each pair being interconnected by a respective differential drive transmission gearing, the differential drive transmission gearings having their input shafts interconnected by a driven transmission arrangement so that a power plant, mounted on one of the chassis portions and connected to drive the adjacent input shaft, will drive all the ground wheels, means being provided for reacting between the bridge member and the said other portion whereby the chassis portions may be articulated for the said steering purposes. This arrangement has the advantage of providing an all-wheel-drive construction in which the ground wheels of one axle will follow the tracks of the ground wheels of the other axle thereby preventing "wind-up" and improving traction over soft ground.

Although this arrangement is entirely satisfactory for the design of vehicle disclosed, I have encountered some problems in modifying the design to carry greater loads. Although the centre articulation of the chassis is ideal for controlling the steering of the vehicle, it imposes limitations on the design of the skip as it is difficult to extend the skip substantially past the centre of the articulated chassis. Even if this problem is overcome, further difficulties arise relating to the stability of the vehicle. For traction purposes it is desirable to have balanced loads supported by all four ground wheels and this inherently means that the centre of gravity of the useful load must be between the two axles. However, when the chassis is articulated, the centre of gravity is then displaced transversely with respect to the ground contact areas of the wheels thereby generating a sideways overturning couple which increases with the angle of chassis deflection and the size of the load. With smaller dumpers this overturning couple is insignificant but, if one wishes to increase the load substantially for the same track, the overturning couple becomes more critical. To reduce the value of the overturning couple to an acceptable value without decreasing the useful load or without increasing the vehicle track, it is necessary to move the centre of gravity towards one of the axles — this has the undesirable effect of causing unbalanced loading of the two axles and of consequently reducing the useful load unless the axle taking the extra load is strengthened. Furthermore a tipping couple is applied to the vehicle and this can adversely affect the vehicle stability if really heavy loads are to be carried.

An object of this invention is to provide a vehicle chassis which can support its maximum designed load substantially equally from its four ground wheels, whilst also providing a drive to all four ground wheels and enabling the chassis to be steered without "wind-up" and without having to supply expensive constant velocity drive couplings to the ground wheels.

According to the invention a vehicle chassis includes a chassis frame supported by first and second axle assemblies each of which is provided with a pair of axially spaced coaxial ground wheels, a first pivot device mounted for pivoting relatively to the chassis frame about a first vertical axis intersecting the longitudinal axis of the chassis frame, said first pivot device connecting one end of the chassis frame to the first axle assembly, a second pivot device mounted for pivoting relatively to the chassis frame about a second vertical axis intersecting the longitudinal axis of the chassis frame, said second pivot device connecting the other end of the chassis frame to a third pivot device, said third pivot device mounted for pivoting relatively to the second pivot device about a horizontal axis, said third pivot device connecting the second pivot device to the second axle assembly such that said horizontal axis will be parallel with and will lie in the same vertical plane as the longitudinal axis of the chassis frame whenever the axis of rotation of the ground wheels of the second axle assembly is at right angles to said longitudinal axis of the chassis frame whereby the ground wheels of the second axle assembly are permitted respectively to rise and fall relatively to the ground wheels of the first axle assembly, a steering means for slewing the first and second pivot devices in opposite senses about their respective vertical axes relatively to the chassis frame, and means for driving the ground wheels of at least one of the axle assemblies.

Preferably the first and second pivot devices each comprise a turntable reacting against an undersurface of the chassis frame. Each turntable may comprise a lower horizontal ring which is supported by a bearing means from an upper coaxial horizontal ring secured to the corresponding end of the chassis frame, whereby the lower ring is able to rotate about its vertical axis relative to the chassis frame. The bearing means may comprise a circular series of ball bearings separating respective bearing surfaces defined by the upper and lower rings. The third pivot device preferably comprises a support frame secured to the second axle assembly and pivoted to the second pivot device about said horizontal axis.

The steering means may include a steering actuator for determining the angle to which one of said first or second pivot devices is slewed relatively to the chassis frame, and a steering linkage interconnecting said first and second pivot devices whereby the slewing movement of said one pivot device in either sense will cause a corresponding movement of the other of said first or second pivot devices in the opposite sense. Preferably the steering actuator reacts between the chassis frame and said one pivot device. The steering actuator is conveniently a fluid-operated piston and cylinder device. Preferably the steering linkage includes a horizontal link pivoted at one end to the first pivot device about a third vertical axis and pivoted at the other endto the second pivot device about a fourth vertical axis, the third and fourth vertical axes being equally spaced respectively from the first and second vertical axes, and the third and fourth vertical axes lying on opposite sides of the longitudinal axis of the chassis frame and being equally spaced therefrom whenever the axes of rotation of the ground wheels of the first and second axle assemblies are at right angles to said longitudinal axis of the chassis frame. Desirably the steering linkage additionally includes a second horizontal link which is pivoted at one end to the first pivot device about a fifth vertical axis and is pivoted at the other end to the second pivot device about a sixth vertical axis, the fifth and sixth vertical axes being spaced respectively from the first and second vertical axes by the same distance as the third and fourth vertical axes, and the fifth and sixth vertical axes being equally spaced from the longitudinal axis of the chassis but on the opposite side thereof to the third and fourth axes respectively whenever the axes of rotation of the ground wheels of the first and second axle assemblies are at right angles to said longitudinal axis of the chassis frame.

Preferably the first axle assembly includes an axle casing supporting the coaxial ground wheels which are interconnected by a differential drive transmission gearing, the means for driving the ground wheels of the first axle assembly is a prime mover and transmission arrangement supported by the chassis frame adjacent the second axle assembly and connected by a first universal coupling to drive a length compensating torque transmission shaft which is connected to drive a power input member of the differential drive transmission gearing through a second universal coupling. The second axle assembly preferably includes an axle casing supporting the coaxial ground wheels which are interconnected by a differential drive transmission gearing, a second length compensating torque transmission shaft is connected at one end by a third universal coupling to be driven from the power input member of the differential drive transmission gearing of the first axle assembly, and the other end of the second length compensating torque transmission shaft is connected by a fourth universal coupling to drive a power input member of the differential drive transmission gearing of the second axle assembly. A transfer gear mechanism may be carried by the axle casing of the first axle assembly and has its power input gear coaxially driven by the second universal coupling and its power output gear arranged coaxially to drive both the third universal coupling and the power input member of the differential drive transmission gearing of the first axle assembly.

According to another aspect of the invention the vehicle chassis is provided with a skip for carrying a load of material, and the skip is shaped and positioned relatively to the centre of gravity of the unloaded vehicle such that, when the maximum design load is carried in the skip and is distributed in the skip in a reasonable manner, the centre of gravity of the loaded vehicle will lie substantially on the longitudinal axis of the chassis frame mid-way between the first and second axle assemblies.

The invention is now described, by way of example only, with reference to the accompanying drawings, in which.

Figure 1:
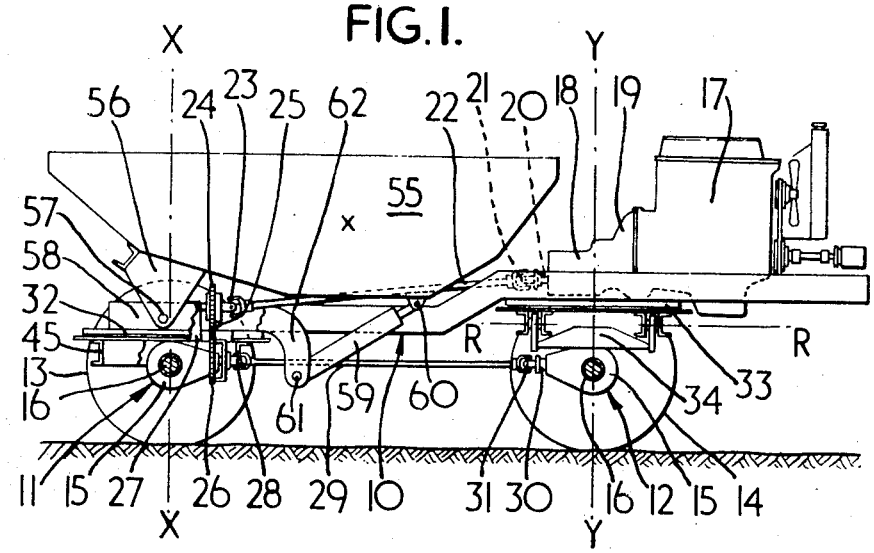
FIG. 1 is a diagrammatic side elevation of a vehicle chassis supporting a dumper skip.

In the drawings, a chassis frame is indicated generally by arrow 10 and supports front and rear axle assemblies 11 and 12 in a manner which will be described later. The front axle assembly 11 supports a pair of axially spaced coaxial ground wheels 13 and the rear axle assembly 12 supports a pair of axially spaced coaxial ground wheels 14. Both the front axle assembly 11 and the rear axle assembly 12 are of similar construction comprising an axle casing 15 supporting the respective ground wheels 13, 14 which are interconnected by means of half shafts 16 and a differential drive transmission gearing which is of conventional construction and is not shown. The wheels 13, 14 are secured to hubs at the ends of the half shafts 16 in a conventional manner including disc brakes which are operated by an hydraulic system controlled from a driver's seat (not shown) on the chassis frame 10.

An internal combustion engine 17 is mounted at the rearward end of the chassis frame 10, and is arranged to drive a change-speed gearing 18 through a clutch 19. A power output shaft 20 from the change-speed gearing 18 is connected by a first universal coupling 21 to drive a propeller shaft 22 which is connected by a second universal coupling 23 to drive a power input sprocket 24 of a transfer gearing. This transfer gearing comprises the power input sprocket 24 which is connected by a chain 25 to drive a power output sprocket 26 which is drivingly connected to an unseen power input pinion for the front axle assembly 11. The transfer gear mechanism is supported by a casing 27 which is rigidly carried by the front axle assembly 11. If desired the casing 27 can be arranged to enclose the power input and output sprockets 24 and 26 and the chain 25. Also the power input and output sprockets 24 and 26 can be replaced by corresponding gears thereby omitting the chain 25, the power input and output gears 24 and 26 either meshing directly together, or through idler or change-speed gear trains or other drive transmission devices as required.

The power output sprocket 26 of the transfer gear mechanism is arranged coaxially to drive a third universal coupling 28 which is connected by a propeller shaft 29 to drive the power input pinion 30 of the rear axle assembly 12 through a fourth universal coupling 31. The two propeller shafts 22 and 29 are each provided in the usual manner with a length compensating coupling of the splined or any other convenient type, for reasons which will become apparent later. To this point it will be understood that the front axle assembly 11 is driven from the internal combustion engine 17 by the propeller shaft 22 and the transfer gear mechanism 24, 25 and 26, whilst the rear axle assembly 12 is simultaneously driven by the propeller shaft 29 from the power output sprocket 26 of the transfer gear mechanism. Thus, all four ground wheels are driven simultaneously by the engine 17, the two differential drive transmission gearings ensuring an equal distribution of tractive effort to the four wheels provided that no "wind-up" occurs.

Figure 2:
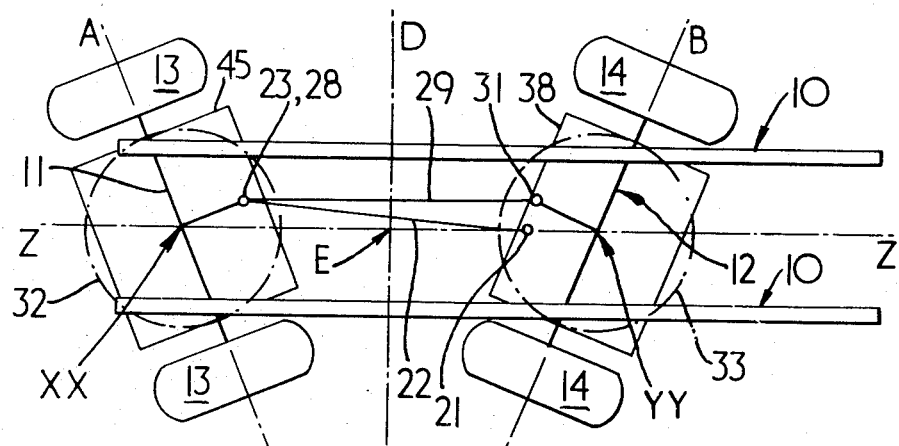
FIG. 2 is a diagrammatic plan of the vehicle chassis shown in FIG. 1 and illustrating the steering of the ground wheels.
Figure 4:
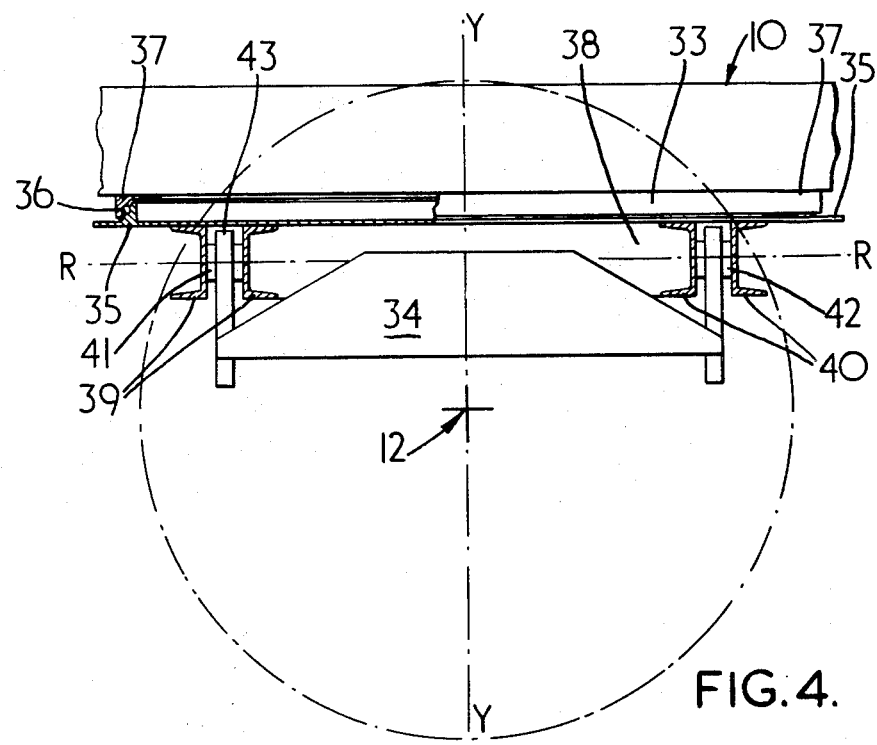
FIG. 4 is an enlarged vertical section through the right-hand of the vehicle chassis as if taken on the line 4—4 in FIG. 3.

To prevent "wind-up" from occurring, it is necessary to ensure that the joint distance travelled by the front ground wheels 13 is always equivalent to the joint distance covered by the rear ground wheels 14. To achieve this, I have supported the front axle assembly 11 and the rear axle assembly 12 from the chassis frame 10 through first and second pivot devices in the form of turntables 32 and 33. These turntables enable the front axle assembly 11 and the rear axle assembly 12 to be pivoted relative to the chassis frame 10 aobut respective vertical axes XX and YY which intersect the longitudinal axis ZZ of the chassis frame 10 as indicated in FIG. 2. I prefer to use a turntable to achieve the pivotal action as this minimises the bending moment applied to the turning parts by the ground wheels. However, any other convenient form of pivot device may be used instead of either, or both, of the turntables 32 and 33. To enable the vehicle chassis to pass over rough ground, the rear axle assembly 12 is connected to the rear turntable 33 through a third pivot device comprising a support frame 34 which is secured to the rear axle assembly 12 and is pivotally connected to the rear turntable 33 for movement about a horizontal axis RR which is arranged to be parallel with the longitudinal axis ZZ of the chassis frame 10 and to lie in the same vertical plane whenever the axis of rotation of the rear ground wheels 14 is at right angles to the longitudinal axis ZZ. In this manner the rear ground wheels 14 are permitted respectively to rise and fall relatively to the front ground wheels 13. With particular reference to FIG. 4, it will be seen that the rear turntable 33 is provided by a lower horizontal ring 35 supported by a series of ball bearings 36 from an upper coaxial horizontal ring 37 which is secured to the underside of the chassis frame 10. The front turntable 32 is constructed in the same manner. The turntable assembly 35, 36, 37 is already well-known in the art of supporting the turrets of machines such as turret cranes and turret excavators and is conveniently available as a bought out component. It should be noted that the ball bearings 36 serve as a combiner journal and thrust bearing and additionally serve to interlock the rings 35 and 37 against axial separation. Thus, the lower ring 35 is able to rotate about its vertical axis relative to the chassis frame 10, all journal and axial loads being transmitted to the upper ring 37.

A generally rectangular steering frame 38 is secured by unshown vertical bolts to the underside of the lower ring 35 and defines two pairs of transverse channel members 39 and 40 which respectively carry two aligned pivot pins 41 and 42 defining the horizontal axis RR. The support frame 34 has a pair of upstanding lugs 43 and 44 which are respectively located between the pairs of transverse channel members 39 and 40 and journalled on the pivot pins 41 and 42. Although I prefer to use the support frame 34 together with the pivot pins 41 and 42 and the lugs 43 and 44, any other convenient form of horizontal pivot device may be employed if desired to allow the rear ground wheels 14 to rise and fall relative to the front ground wheels 13 when the vehicle chassis passes over rough ground. In this manner, all four ground wheels can remain in contact with the ground to support their own share of the overall vehicle weight. A second generally rectangular steering frame 45 is secured by unshown vertical bolts to the underside of the covering 35 of the front turntable 32 and is secured to the front axle assembly 11.

The vehicle chassis is steered by slewing the turntables 32 and 33 together with their associated steering frames 45 and 38 and axle assemblies 11 and 12 in opposite senses about their respective vertical axes XX and YY relative to the chassis frame 10. The desired steering geometry can be seen from FIG. 2 in which the rotational axes AA and BB respectively of the front and rear axle assemblies 11 and 12 are shown intersecting at a point C on a horizontal line DD which crosses the longitudinal axis ZZ of the chassis frame 10 at right angles at a point E lying midway between the vertical axes XX and YY. This geometrical relationship is of course only true when the axes AA and BB are in the same plane, for instance when the vehicle is on level ground. However, when the vehicle is on level ground, this steering geometry will ensure that the radius of the path travelled by either front wheel 13 will be the same as the radius of the path travelled by the corresponding rear wheel 14 — in this manner (provided that none of the wheels tends to slip or skid) the joint distance travelled by the front wheels 13 will at any instant be the same as the joint distance travelled by the rear wheels 14. To achieve this desirable result, it is necessary for the steering means for slewing the turntables 32 and 33 to be designed carefully so that the axes AA and BB will always intersect the line DD at a common point C — the position of C will of course depend on both the direction in which the turntables 32 and 33 are slewed and their angles, the position of C being at infinity when the axes AA and BB are parallel.

Figure 3:
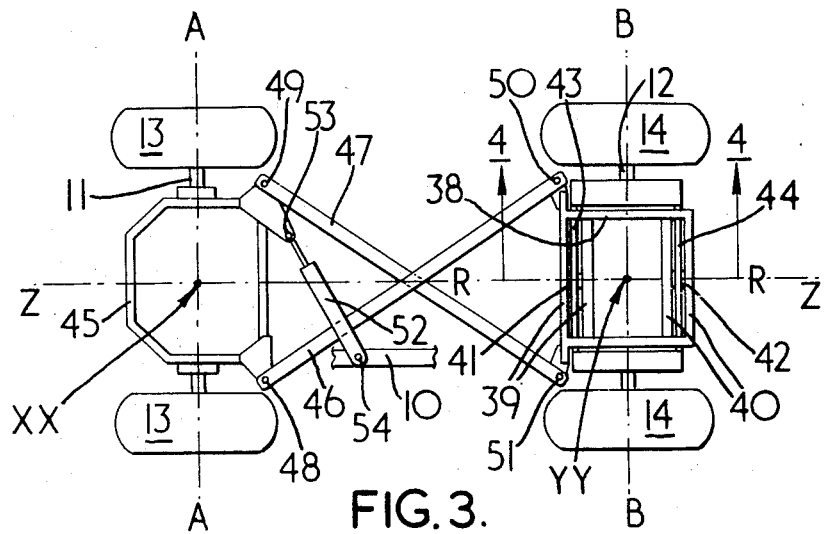
FIG. 3 is a plan of the steering mechanism, the chassis frame and the turntables being omitted, together with the transmission for the road wheels, for the sake of clarity.

In FIG. 3 I disclose a preferred steering means for slewing the turntables 32 and 33 which, it will be recalled, are secured to the respective steering frames 45 and 38. The latter are interconnected by a steering linkage comprising a pair of diagonally crossed horizontal links 46 and 47 having their one ends connected by respective vertical pivots 48, 49 to the front steering frame 45, and their opposite ends connected by respective vertical pivots 50, 51 to the rear steering frame 38. The vertical pivots 48 and 49 are equally spaced from the vertical axis XX and the vertical pivots 50 and 51 are equally spaced by the same amount from the vertical axis YY. The pivots 48, 49, 50 and 51 are also positioned so that, whenever the axes AA and BB are at right angles to the longitudinal axis ZZ of the chassis frame 10, the pivots 48 and 51 will be equally spaced from one side of the axis ZZ and the pivots 49 and 50 will be equally spaced by the same amount from the opposite side of the axis ZZ. With this steering linkage slewing movement of either of the steering frames 45 or 38 in either sense will cause a corresponding movement of the other steering frame 38 or 45 in the opposite sense. By providing the two links 46 and 47, each link only has to transmit tensile loads. However, if desired, one of the links 46 or 47 can be omitted, the remaining link being replaced by a heavier link which can transmit both tensile and compressive loads without deflection.

Steering movement of the steering linkage 46, 47 is preferably achieved by means of a double acting fluid-operated piston and cylinder device 52 connected at one end by a vertical pivot 53 to the front steering frame 45 adjacent the pivot 49, and connected at the other end by a vertical pivot 54 to the chassis frame 10. In this manner a steering wheel, mounted adjacent a driver's seat arranged one one side of the internal combustion engine 17, can be arranged to operate a suitable fluid control valve for actuating the steering piston and cylinder device 52, thereby making the front and rear turntables 32 and 33 move in accordance with the movements of the steering wheel. Although I prefer to use a steering linkage interconnecting the front and rear turntables 32 and 33 so that movement of one turntable in one sense will cause a corresponding movement of the other turntable in the opposite sense, the steering linkage 46, 47 could be omitted, both front and rear turntables 32 and 33 being articulated by individual piston and cylinder devices reacting on the chassis frame 10 and controlled to give the desired relative movement of the two turntables. Although I also prefer the steering linkage 46, 47 shown in FIG. 3, other forms of steering linkage could conceivably be utilised to give an equivalent effect.

When the ground wheels 13, 14 are steered, the propeller shafts 22 and 29 will move into the positions indicated in FIG. 2. It will be noted that the first universal coupling 21 remains in its original position on the longitudinal centre line ZZ of the chassis frame 10, whilst the second universal coupling 23 will have swung about the axis XX of the front turntable 32 to the position shown. The third universal coupling 28 is arranged immediately beneath the second universal coupling 23 and therefore occupies the same position when viewed in plan as indicated in FIG. 2. On the other hand, the fourth universal coupling 31 will have swung to the position shown due to the rotation of the rear turntable 33. With this geometry, it will be appreciated that the lengths of both propeller shafts 22 and 29 will inherently change during steering movements, and that the propeller shaft 29 will always remain parallel to the chassis frame 10, whilst moving transversely due to steering movements. On the other hand, the propeller shaft 22 will tend to swing from side to side about the fixed location of the first universal coupling 21. It will be noted that considerable steering movements can be achieved without requiring excessive deflections of the four universal drive couplings. The first universal drive coupling 21 has conveniently been arranged directly above the fourth universal drive coupling 31 whenever the axes AA and BB are parallel to the line DD. However, this position is not at all critical as the deflection of the second universal drive coupling 23 is only slightly greater than that of the third universal drive coupling 28. If desired, the first universal coupling 21 can be moved further forwards along the longitudinal axis of the vehicle chassis to reduce the deflection of the second universal coupling 23 somewhat.

From FIG. 1 it will be noted that a large capacity skip 55 is supported from the front of the chassis frame 10 by means of brackets 56 secured by transverse tipping pins 57 which engage corresponding lugs 58 on the sides of the chassis frame 10. The skip 55 is tipped by a pair of fluid-operated piston and cylinder devices 59 arranged one each side of the chassis frame 10 and connected at one end by a transverse horizontal pivot 60 to the base of the skip 55, and connected at the other end by a transverse horizontal pivot 61 to a curved bracket 62 secured to the chassis frame 10. The skip 55 is so shaped and positioned relative to the chassis frame 10 that the approximate centre of gravity of the fully loaded skip (assuming a reasonable distribution of the load in the skip) will be in the position marked "X" and will also lie substantially on the longitudinal axis ZZ. It will be noted that the centre of gravity "X" of the fully loaded skip is close to the centre point between the front and rear axles 11 and 12 and is so positioned that, when the counter balancing effect of the internal combustion engine 17 and the remainder of the vehicle chassis is taken into account, the effective centre of gravity of the fully laden vehicle lies on the longitudinal axis ZZ exactly between the front and rear axle assemblies 11 and 12 so that balanced loads are supported by all four ground wheels. However, as the chassis does not articulate, steering movements do not cause the centre of gravity to move transversely relative to the ground contact areas of the wheels. In this manner, the vehicle is inherently stable whilst enabling all four wheels to be driven without incurring "wind-up." In addition to providing a construction of vehicle chassis which will enable heavier loads to be carried without incurring instability, this construction enables a better weight distribution to be achieved on the wheels. I find that, for a given pair of axles, this construction enables me to carry a heavier load than has hitherto been possible.

What I claim as my invention and desire to secure by Letters Patent of the United States is:

1. A vehicle chassis comprising first and second axle assemblies, a chassis frame supported by said first and second axle assemblies, a pair of axially spaced coaxial ground wheels supported by each axle assembly, a prime mover adjacent one end of the chassis frame for driving the ground wheels of at least one of said axle assemblies, and steering means for effecting the co-ordinated movement of the ground wheels of both axle assemblies relative to the chassis frame, a first pivot device connecting the first axle assembly to one end of the chassis frame for relative pivotling about a first vertical axis, a second pivot device, a third pivot device connected by said second pivot device to the other end of the chassis frame for relative pivoting about a second vertical axis, said third pivot device connecting said second axle assembly to the second pivot device for relative pivoting about a horizontal axis, the first and second pivot devices being positioned relative to the chassis frame for the first and second vertical axes to intersect the longitudinal axis of the chassis frame, the third pivot device being positioned relative to the second axle assembly for said horizontal axis to lie in the same vertical plane as the longitudinal axis of the chassis frame whenever the axis of rotation of the ground wheels supported by the second axle assembly is at right angles to the longitudinal axis of the chassis frame whereby to permit the ground wheels of the second axle assembly to rise and fall respectively to the ground wheels of the first axle assembly, and said steering means is arranged to turn the first and second pivot devices and consequently the first and second axle assemblies in opposite senses about said first and second vertical axes, wherein the improvement comprises the chassis frame constituting a chassis of a dumper-type vehicle, a load-carrying container on said chassis frame, the load-carrying container extending substantially between one end of said chassis frame and a position adjacent the prime mover such that when the maximum design load is carried in said load-carrying container in a reasonable manner, the centre of gravity of the loaded vehicle will lie substantially on the longitudinal axis of the chassis frame mid-way between said first and second axle assemblies and the load on each wheel will be substantially equal.

2. A vehicle chassis as in claim 1 wherein each of said first and second pivot devices comprises a turntable reacting against and undersurface defined by said chassis frame.

3. A vehicle chassis as in claim 2 wherein each turntable comprises an upper horizontal ring secured to the appropriate end of the chassis frame, a lower horizontal ring positioned coaxially below said upper horizontal ring, and a bearing means positioned between said upper and lower horizontal rings to permit rotation of the lower horizontal ring about its vertical axis relative to the chassis frame.

4. A vehicle chassis as in claim 1 wherein said third pivot device comprises a support frame secured to said second axle assembly and pivoted to the second pivot device and said horizontal axis.

5. A vehicle chassis as in claim 1 wherein said steering means comprises a steering actuator for determining the angle to which one of said first or second pivot devices is to be slewed relatively to the chassis frame, and a steering linkage interconnecting the first and second pivot devices whereby the slewing movement of said one pivot device in either sense will cause a corresponding movement of the other of said first or second pivot devices in the opposite sense.

6. A vehicle chassis as in claim 5, wherein the steering actuator is connected to react between the chassis frame and said one pivot device.

7. A vehicle chassis as in claim 5 wherein said steering linkage comprises a horizontal link pivoted at one end to said first pivot device about a third vertical axis and pivoted at the other end to said second pivot device about a fourth vertical axis, said third and fourth vertical axes being equally spaced respectively from said first and second vertical axes and, said third and fourth vertical axes lying on opposite sides of the longitudinal axis of the chassis frame and being equally spaced therefrom whenever the axes of rotation of the ground wheels supported by the first and second axle assemblies are at right angles to the longitudinal axis of the chassis frame.

8. A vehicle chassis as in claim 7 wherein said steering linkage comprises a second horizontal link pivoted at one end to the said first pivot device about a fifth vertical axis and pivoted at the other end to said second pivot device about a sixth vertical axis, said fifth and sixth vertical axes being spaced respectively from said first and second vertical axes by the same distance as said third and fourth vertical axes, and the fifth and sixth vertical axes being equally spaced from the longitudinal axis of the chassis frame but on the opposite side thereof to the third and fourth axes respectively whenever the axes of rotation of the ground wheels supported by the first and second axle assemblies are at right angles to the longitudinal axis of the chassis frame.

9. A vehicle chassis as in claim 1 wherein said first axle assembly comprises an axle casing supporting said coaxial ground wheels, a differential drive transmission gearing interconnects said ground wheels of the first axle assembly, said driving means for driving the ground wheels of at least one of said axle assemblies is a prime mover and transmission arrangement supported by the chassis frame adjacent said second axle assembly, said transmission arrangement is connected by a first universal coupling to drive a length compensating torque transmission shaft, and a second universal coupling is connected to be driven by said length compensating torque transmission shaft and is connected to drive a power input member of said differential drive transmission gearing.

10. A vehicle chassis as in claim 9 wherein said second axle assembly comprises an axle casing supporting said coaxial ground wheels, a differential drive transmission gearing interconnects said ground wheels of the second axle assembly, a second length compensating torque transmission shaft is connected at one end by a third universal coupling to be driven from said power input member of the first axle assembly, and the other end of said second length compensating torque transmission shaft is connected by a fourth universal coupling to drive a power input member of the differential drive transmission gearing to said second axle assembly.

11. A vehicle chassis as in claim 10 wherein a transfer gear mechanism is carried by the axle casing of said first axle assembly, a power input gear of said transfer gear mechanism is coaxially driven by said second universal coupling, and a power output gear of said transfer gear mechanism is arranged coaxially to drive both said third universal coupling and the power input member of the first axle assembly.

12. A vehicle chassis comprising first and second axle assemblies, a chassis frame supported by said first and second axle assemblies, a pair of axially spaced coaxial ground wheels supported by each axle assembly, driving means for driving the ground wheels of at least one of said axle assemblies, and steering means for effecting the co-ordinated movement of the ground wheels of both axle assemblies relative to the chassis frame, a first pivot device connecting the first axle assembly to one end of the chassis frame for relative pivoting about a first vertical axis, a second pivot device, a third pivot device connected by said second pivot device to the other end of the chassis frame for relative pivoting about a second vertical axis, said third pivot device connecting said second axle assembly to the second pivot device for relative pivoting about a horizontal axis, the first and second pivot devices being positioned relative to the chassis frame for the first and second vertical axes to intersect the longitudinal axis of the chassis frame, the third pivot device being positioned relative to the second axle assembly for said horizontal axis to lie in the same vertical plane as the longitudinal axis of the chassis frame whenever the axis of rotation of the ground wheels supported by the second axle assembly is at right angles to the longitudinal axis of the chassis frame whereby to permit the ground wheels of the second axle assembly to rise and fall respectively to the ground wheels of the first axle assembly, and said steering means is arranged to turn the first and second pivot devices and consequently the first and second axle assemblies in opposite senses about said first and second vertical axes, a steering linkage interconnecting the first and second pivot devices whereby the slewing movement of said one pivot device in either sense will cause a corresponding movement of the other of said first or second pivot devices in the oppoiste sense, wherein the improvement comprises the inclusion in the steering linkage of a horizontal link pivoted at one end to said first pivot device about a third vertical axis and pivoted at the other end to said second pivot device about a fourth vertical axis, said third and fourth vertical axes being equally spaced respectively from said first and second vertical axes, and said third and fourth vertical axes lying on opposite sides of the longitudinal axis of the chassis frame and being equally spaced therefrom whenever the axes of rotation of the ground wheels supported by the first and second axle assemblies are at right angles to the longitudinal axis of the chassis frame.

13. A vehicle chassis, as in claim 12, wherein said steering linkage comprises a second horizontal link pivoted at one end to the said first pivot device about a fifth vertical axis and pivoted at the other end to said second pivot device about a sixth vertical axis, said fifth and sixth vertical axes being spaced respectively from said first and second vertical axes by the same distance as said third and fourth vertical axes, and the fifth and sixth vertical axes being equally spaced from the longitudinal axis of the chassis frame but on the opposite side thereof to the third and fourth axes respectively whenever the axes of rotation of the ground wheels supported by the first and second axle assemblies are at right angles to the longitudinal axis of the chassis frame.

14. A vehicle chassis comprising first and second axle assemblies, a chassis frame supported by said first and second axle assemblies, a pair of axially spaced coaxial ground wheels supported by each axle assembly, driving means for driving the ground wheels of at least one of said axle assemblies, and steering means for effecting the co-ordinated movement of the ground wheels of both axle assemblies relative to the chassis frame, a first turntable connecting the first axle assembly to one end of the chassis frame for relative pivoting about a first vertical axis, a second turntable, a third pivot device connected by said second turntable to the other end of the chassis frame for relative pivoting about a second vertical axis, said third pivot device connecting said second axle assembly to the second turntable for relative pivoting about a horizontal axis, the first and second turntables reacting against an undersurface defined by said chassis frame and being positioned relative to the chassis frame for the first and second vertical axes to intersect the longitudinal axis of the chassis frame, the third pivot device being positioned relative to the second axle assembly for said horizontal axis to lie in the same vertical plane as the longitudinal axis of the chassis frame whenever the axis of rotation of the ground wheels supported by the second axle assembly is at right angles to the longitudinal axis of the chassis frame whereby to permit the ground wheels of the second axle assembly to rise and fall respectively to the ground wheels of the first axle assembly, and said steering means is arranged to turn the first and second turntables and consequently the first and second axle assemblies in opposite senses about said first and second vertical axes wherein the improvement comprises each turntable comprising an upper horizontal ring secured to the appropriate end of the chassis frame, a lower horizontal ring positioned coaxially below said upper horizontal ring, and a bearing means positioned between said upper and lower horizontal rings to permit rotation of the lower horizontal ring about its vertical axis relative to the chassis frame.

* * * * *